United States Patent [19]

Shoji et al.

[11] Patent Number: 5,490,424
[45] Date of Patent: Feb. 13, 1996

[54] PRESSURE SENSOR WITH MOISTURE RESISTANCE AND UNIFORM CHARACTERISTICS

[75] Inventors: Rihito Shoji, Yawata; Shinji Saitou, Suita, both of Japan

[73] Assignee: Matsushita Electric Industrial Co., Ltd., Kadoma, Japan

[21] Appl. No.: 206,505

[22] Filed: Mar. 4, 1994

[30] Foreign Application Priority Data

Mar. 9, 1993 [JP] Japan ................................ 5-047703
Mar. 15, 1993 [JP] Japan ................................ 5-054190

[51] Int. Cl.$^6$ ................................ G01L 9/10; G01L 7/04
[52] U.S. Cl. ................................ 73/728; 73/730; 336/30
[58] Field of Search ................................ 73/722, 728, 730; 336/30

[56] References Cited

U.S. PATENT DOCUMENTS

| | | | |
|---|---|---|---|
| 3,603,152 | 9/1971 | Alibert et al. | 73/730 X |
| 4,365,517 | 12/1982 | Ramel et al. | 73/728 X |
| 4,412,454 | 11/1983 | Yamashita et al. | 73/728 |
| 4,938,069 | 7/1990 | Shoji et al. | 73/728 |

FOREIGN PATENT DOCUMENTS

| | | |
|---|---|---|
| 0371244 | 6/1990 | European Pat. Off. . |
| 3604088 | 8/1987 | Germany . |

OTHER PUBLICATIONS

Search Report for European Appl. 94103512.3 mailed Jun. 23, 1994.
"Variable New Pressure Transducer Eliminates Diaphragm", Technological Digests, 8, 1963, pp. 61–62.

*Primary Examiner*—Hezron E. Williams
*Assistant Examiner*—Joseph L. Felber
*Attorney, Agent, or Firm*—Renner, Otto, Boisselle & Sklar

[57] ABSTRACT

The invention is a pressure sensor including a main body including a pressure inlet at and end thereof, a deformable section deformed by a pressure introduced through the pressure inlet, and a non-deformable section maintaining the shape thereof even when supplied with a pressure introduced through the pressure inlet; an amorphous magnetic alloy member having a magnetostriction constant, the amorphous magnetic alloy member being adhered on the deformable section and the non-deformable section; a first permeability detection element for detecting the permeability of a part of the amorphous magnetic alloy member corresponding to the deformable section; a second permeability detection element for detecting the permeability of another part of the amorphous magnetic alloy member corresponding to the non-deformable section; and a yoke for covering the first and the second permeability detection elements; the yoke is adhered on the main body. The amorphous magnetic alloy member and the first and the second permeability detection elements are included in a magnetic circuit, and pressure detection is performed based on the difference between the permeability detected by the first permeability detection element and the permeability detected by the second permeability detection element. The difference is caused by the application of pressure.

18 Claims, 3 Drawing Sheets

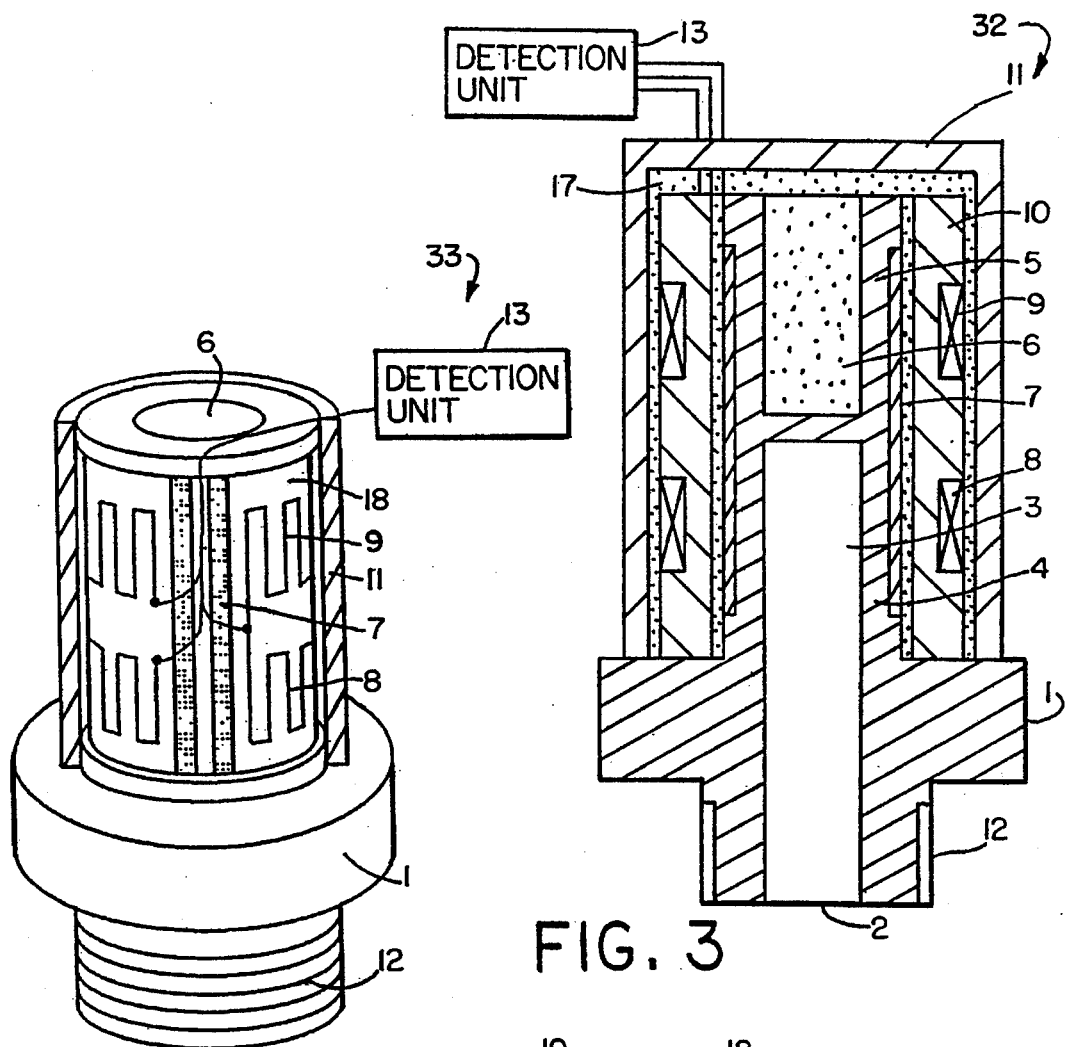
FIG. 3
FIG. 4
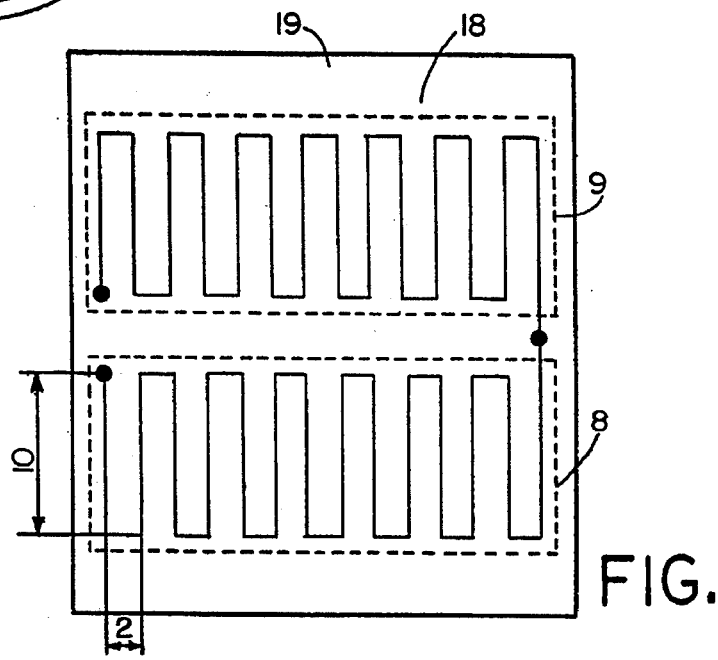
FIG. 5

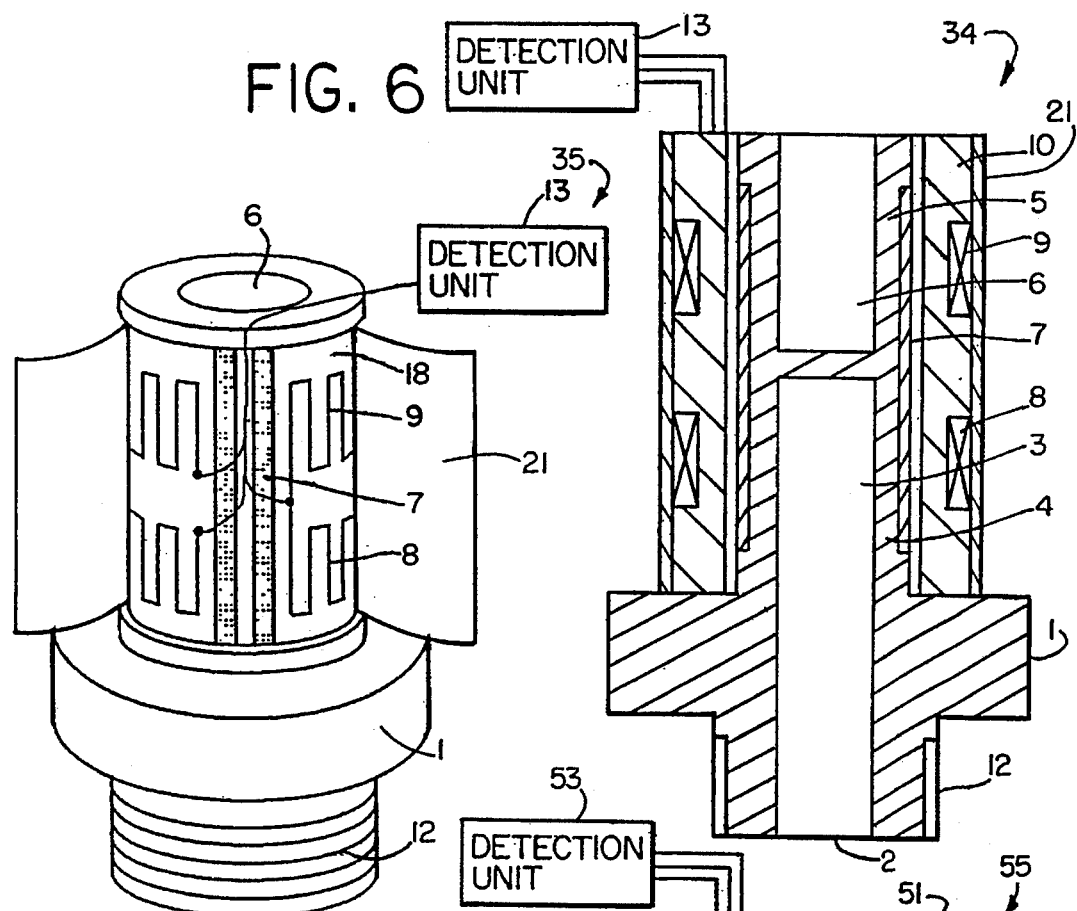
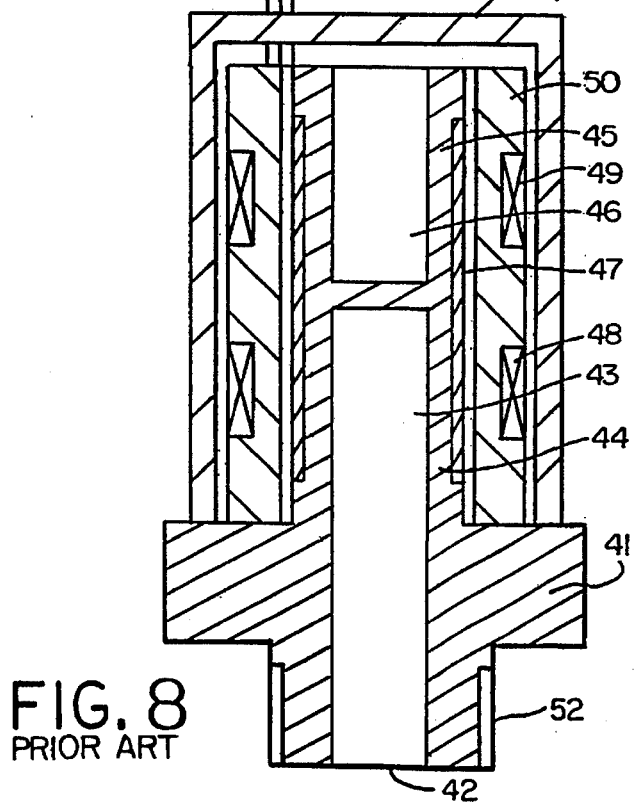
FIG. 6
FIG. 7
FIG. 8
PRIOR ART

PRESSURE SENSOR WITH MOISTURE RESISTANCE AND UNIFORM CHARACTERISTICS

BACKGROUND OF THE INVENTION

1. Field of the Invention

The present invention relates to a pressure sensor utilizing the magnetostriction effect of an amorphous magnetic alloy.

2. Description of the Related Art

A pressure sensor utilizing the magnetostriction effect of an amorphous magnetic alloy (which was invented by a group including one of the inventors of he present invention) is disclosed in the U.S. Pat. No. 4,938,069.

Referring to FIG. 8, such a conventional pressure sensor will be described. FIG. 8 is a cross sectional view of a pressure sensor 55.

The pressure sensor 55 includes a cylindrical main body 41. The main body 41 includes a pressure chamber 43 for conveying a pressure and a hollow section 46. The pressure chamber 43 and the hollow section 46 have an identical diameter with each other. A part of the main body 41 enclosing the pressure chamber 43 is a deformable section 44 which is deformable when being supplied with a pressure. A part of the main body 41 enclosing the hollow section 46 is a non-deformable section 45 which is not deformable when being supplied with a pressure. The main body 41 has a pressure inlet 42 an at end thereof, and an outer peripheral surface of the pressure inlet 42 is provided with a screw thread 52 for securing the main body 41 to, for example, a container (not shown), the inner pressure of which is to be detected. The pressure chamber 43 is in fluid communication with the inside of the container.

An amorphous magnetic alloy member 47 is adhered on a part of the outer peripheral surface of the main body 41 to cover both of the deformable section 44 and the non-deformable section 45. The amorphous magnetic alloy member 47 is adhered by an adhesive agent including an imide material. When the volume of the deformable section 44 changes in accordance with a change in the inner pressure of the pressure chamber 43, the permeability of the amorphous magnetic alloy member 47 also changes.

The main body 41 provided with the amorphous magnetic alloy member 47 is enclosed by a bobbin 50. A pressure detection coal 48 formed of a wire winding and a dummy coil 49 are provided at the outer peripheral surface of the bobbin 50. The pressure detection coil 48 is located at a position corresponding to the deformable section 44, and the dummy coil 49 is located at a position corresponding to the non-deformable section 45. The pressure detection coil 48 and the dummy coil 49 are both connected to a detection unit 53. The detection unit 53 detects a change in the inductance of the detection coil 48 using the inductance of the dummy coil 49 as a reference value, thus to detect an inner pressure of the pressure chamber 43 based on the above-mentioned change. The change in the inductance of the pressure detection coil 48 corresponds to a change in the permeability of the amorphous magnetic alloy member 47. A yoke 51 is attached to the main body 41 by a screw (not shown) to cover the pressure detection coil 48 and the dummy coil 49.

A pressure sensor 55 having the above-described structure operates in the following manner.

The inner pressure of the container to which the pressure sensor 55 is secured is introduced to the pressure chamber 43 through the pressure inlet 42 to apply a stress to expand the pressure chamber 43. As a result, the deformable section 44 is deformed, and thus a part of the amorphous magnetic alloy member 47 covering the deformable section 44 is also deformed. By such deformation, the permeability of the above-mentioned part of the amorphous magnetic alloy member 47 changes due to a reverse magnetostriction effect in the amorphous magnetic alloy. Such a change in the permeability is detected by the detection unit 53 as a change in the inductance of the pressure detection coil 48. By contrast, the inductance of the dummy coil 49, which is located around the non-deformable section 45, does not change. The detection unit 53 obtains the difference between the inductances of the pressure detection coil 48 and the dummy coil 49, thereby detecting the pressure.

In such a conventional pressure sensor 55, the adhesive agent including an imide material is deteriorated by thermal shock and humidity, and thus the amorphous magnetic alloy member 47 peels off.

Further, when a plurality of pressure sensors 55 were produced and evaluated, there was non-uniformity in both of the outputs from the pressure detection coil 48 and the outputs from the dummy coil 49. Accordingly, the output characteristics of each of the pressure sensors are required to be corrected by the detection unit 53.

Still further, since provision of the bobbin 50 and the yoke 51 increases the diameter of the entire pressure sensor 55, reduction in the size is limited.

SUMMARY OF THE INVENTION

A pressure sensor according to the present invention includes a main body including a pressure inlet at and end thereof, a deformable section deformed by a pressure introduced through the pressure inlet, and a non-deformable section maintaining a shape thereof even when supplied with a pressure introduced through the pressure inlet; an amorphous magnetic alloy member having a magnetostriction constant, the amorphous magnetic alloy member being adhered on the deformable section and the non-deformable section; a first permeability detection element for detecting the permeability of a part of the amorphous magnetic alloy member corresponding to the deformable section; a second permeability detection element for detecting the permeability of another part of the amorphous magnetic alloy member corresponding to the non-deformable section; and a yoke for covering the first and the second permeability detection elements, the yoke is adhered on the main body. The amorphous magnetic alloy member and the first and the second permeability detection elements are included in a magnetic circuit, and pressure detection is performed based on the difference between the permeability detected by the first permeability detection element and the permeability detected by the second permeability detection element. The difference is caused by application of pressure.

In one embodiment of the invention, the yoke and the main body are adhered to each other by welding, and a space enclosed by the yoke and the main body and sealed by the welding is filled with a dry gas.

In one embodiment of the invention, the yoke and the main body are adhered to each other by welding, and a space enclosed by the yoke and the main body and enclosed by the welding is a vacuum.

In one embodiment of the invention, a space enclosed by the yoke and the main body is filled with a resin.

In one embodiment of the invention, the amorphous magnetic alloy member is formed of an alloy including Fe-Si-B-Cr.

In one embodiment of the invention, the first and the second permeability detection elements are each formed by winding a wire.

In one embodiment of the invention, the first and the second permeability detection elements are obtained by forming two identical patterns formed on a flexible substrate and adhering the substrate on an outer peripheral surface of the amorphous magnetic alloy member.

In one embodiment of the invention, the flexible substrate is formed of polyimide.

In one embodiment of the invention, the yoke is formed of a magnetic material having a magnetostriction constant, the absolute value of which is $1 \times 10^{-6}$ at the maximum.

In one embodiment of the invention, the yoke is formed of an amorphous magnetic alloy including Co-Fe-Ni-B-Si.

In another aspect of the invention, a pressure sensor includes a main body including a pressure inlet at and end thereof, a deformable section deformed by a pressure introduced through the pressure inlet, and a non-deformable section maintaining a shape thereof even when supplied with a pressure introduced through the pressure inlet; an amorphous magnetic alloy member having a magnetostriction constant, the amorphous magnetic alloy member being adhered on the deformable section and the non-deformable section; a first permeability detection element for detecting the permeability of a part of the amorphous magnetic alloy member corresponding to the deformable section; a second permeability detection element for detecting the permeability of another part of the amorphous magnetic alloy member corresponding to the non-deformable section; and a yoke for covering the first and the second permeability detection elements. The amorphous magnetic alloy member and the first and the second permeability detection elements are included in a magnetic circuit, and pressure detection is performed based on the difference between the permeability detected by the first permeability detection element and the permeability detected by the second permeability detection element. The difference is caused by application of pressure. The first and the second permeability detection elements are obtained by forming two identical patterns formed on a flexible substrate and adhering the substrate on an outer peripheral surface of the amorphous magnetic alloy member.

In still another aspect of the invention, a pressure sensor includes a main body including a pressure inlet at an end thereof, a deformable section deformed by a pressure introduced through the pressure inlet, and a non-deformable section maintaining an shape thereof even when supplied with a pressure introduced through the pressure inlet; an amorphous magnetic alloy member having a magnetostriction constant, the amorphous magnetic alloy member being adhered on the deformable section and the non-deformable section; a first permeability detection element for detecting the permeability of a part of the amorphous magnetic alloy member corresponding to the deformable section; a second permeability detection element for detecting the permeability of another part of the amorphous magnetic alloy member corresponding to the non-deformable section; and a yoke for covering the first and the second permeability detection elements. The amorphous magnetic alloy member and the first and the second permeability detection elements are included in a magnetic circuit, and pressure detection is performed based on the difference between the permeability detected by the first permeability detection element and the permeability detected by the second permeability detection element. The difference is caused by application of pressure. The yoke is formed of a magnetic material having a magnetostriction constant, the absolute value of which is $1 \times 10^{-6}$ at the maximum.

In yet another aspect of the invention, a pressure sensor includes a main body including a pressure inlet at and end thereof, a deformable section deformed by a pressure introduced through the pressure inlet, and a non-deformable section maintaining a shape thereof even when supplied with a pressure introduced through the pressure inlet; an amorphous magnetic alloy member having a magnetostriction constant, the amorphous magnetic alloy member being adhered on the deformable section and the non-deformable section; a first permeability detection element for detecting the permeability of a part of the amorphous magnetic alloy member corresponding to the deformable section; a second permeability detection element for detecting the permeability of another part of the amorphous magnetic alloy member corresponding to the non-deformable section; and a yoke for covering the first and the second permeability detection elements. The amorphous magnetic alloy member and the first and the second permeability detection elements are included in a magnetic circuit, and pressure detection is performed based on the difference between the permeability detected by the first permeability detection element and the permeability detected by the second permeability detection element. The difference is caused by application of pressure. The first and the second permeability detection elements are obtained by forming two identical patterns formed on a flexible substrate and adhering the substrate on an outer peripheral surface of the amorphous magnetic alloy member. The yoke is formed of a magnetic material having a magnetostriction constant, the absolute value of which is $1 \times 10^{-6}$ at the maximum.

Thus, the invention described herein makes possible the advantages of providing a compact pressure sensor which prevents an amorphous magnetic alloy member from peeling off and also providing uniform output characteristics for a plurality of pressure sensors.

These and other advantages of the present invention will become apparent to those skilled in %he art upon reading and understanding the following detailed description with reference to the accompanying figures.

BRIEF DESCRIPTION OF THE DRAWINGS

FIG. 3 is a cross sectional view of a pressure sensor in a third example according to the present invention.

FIG. 4 is a partially cut perspective view of a pressure sensor in a fourth example according to the present invention.

FIG. 5 is a top view of a coil used in the pressure sensor illustrated in FIG. 4.

FIG. 6 is a cross sectional view of a pressure sensor in a fifth example according to the present invention.

FIG. 7 is a perspective view of a pressure sensor in a sixth example according to the present invention.

FIG. 8 is a cross sectional view of a conventional pressure sensor.

DESCRIPTION OF THE PREFERRED EMBODIMENTS

Hereinafter, the present invention will be described by way of illustrative examples with reference to the accompanying drawings.

EXAMPLE 1

Figure 1:
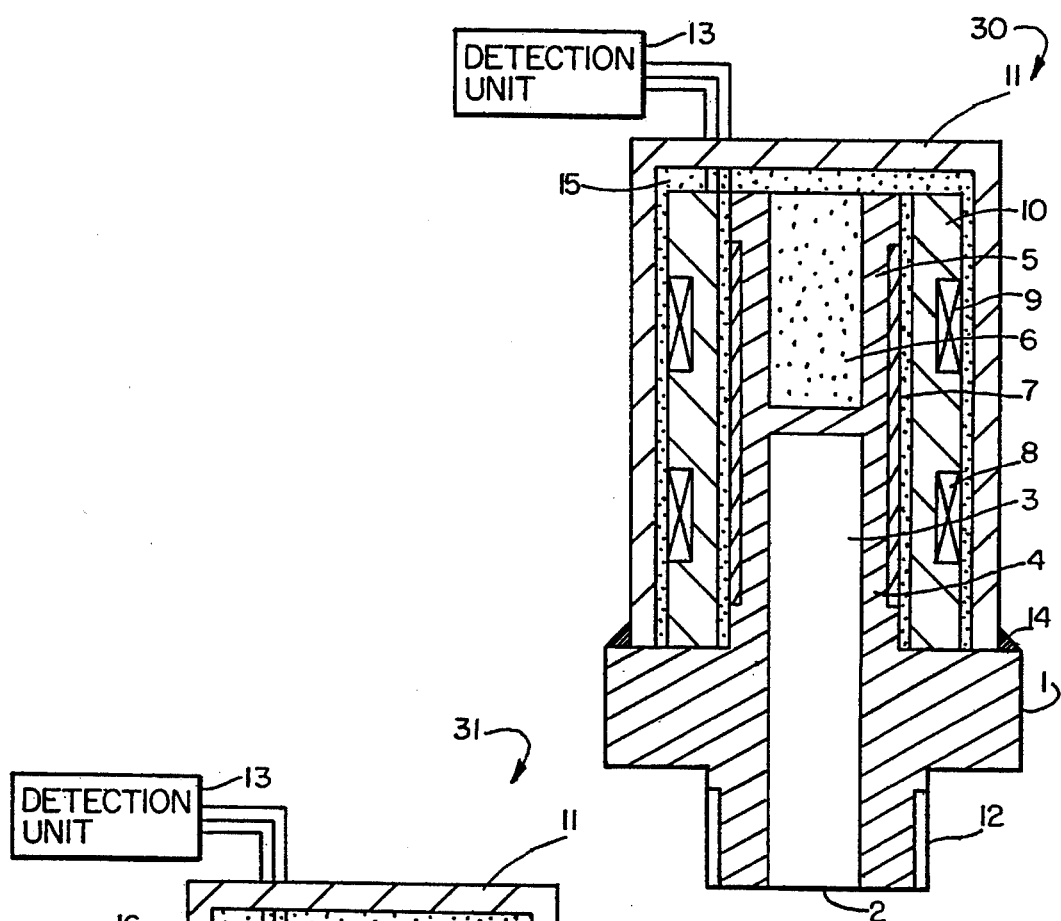
FIG. 1 is a cross sectional view of a pressure sensor in a first example according to the present invention.

With reference to FIG. 1, a first example of a pressure sensor according to the present invention will be described. FIG. 1 is a cross sectional view of a pressure sensor 30 in the first example according to the present invention.

The pressure sensor 30 includes a cylindrical main body 1 formed of titanium having a height of 70 mm. The main body 1 includes a pressure chamber 3 for conveying a pressure and a hollow section 6. The pressure chamber 3 and the hollow section 6 have an identical diameter with each other. In the first example, the inner diameter is 6 mm. A part of the main body 1 enclosing the pressure chamber 3 is a deformable section 4 which is deformable when being supplied with a pressure. A part of the main body 1 enclosing the hollow section 6 is a non-deformable section 5 which is not deformable when being supplied with a pressure. The deformable section 4 and the non-deformable section 5 both have an outer diameter of 10 mm and a thickness of 2 mm. The main body 1 has a pressure inlet 2 an at end thereof, and an outer peripheral surface of the pressure inlet 2 is provided with a screw thread 12 for securing the main body 1 to, for example, a container (not shown), the inner pressure of which is to be detected. The pressure chamber 3 is in fluid communication with the inside of the container. The screw thread 12 has a pitch of PF⅜.

An amorphous magnetic alloy member 7 including Fe-Si-B-Cr and having a thickness of 0.03 mm is adhered on a part of the outer peripheral surface of the main body 1 to cover both the deformable section 4 and the non-deformable section 5. The amorphous magnetic alloy member 7 is adhered by an adhesion process performed at a temperature of 250° C. for an hour, using an adhesive agent including an imide material. When the volume of the deformable section 4 changes in accordance with a change in the inner pressure of the pressure chamber 3, the permeability of the amorphous magnetic alloy member 7 also changes.

The main body 1 provided with the amorphous magnetic alloy member 7 is enclosed by a bobbin 10 formed of a phenolic resin. A pressure detection coil 8 as a first permeability detection element and a dummy coil 9 as a second permeability detection element are provided at the outer peripheral surface of the bobbin 10. The pressure detection coil 8 and the dummy coil 9 are both formed by winding a wire 100 times. The pressure detection coil 8 is located at a position corresponding to the deformable section 4, and the dummy coil 9 is located at a position corresponding to the non-deformable section 5. The pressure detection coil 8 and the dummy coil 9 are both connected to a detection unit 13. The detection unit 13 detects a change in the inductance of the detection coil 8 using the inductance of the dummy coil 9 as e reference value, thus to detect an inner pressure of the pressure chamber 3 based on the above-mentioned change. The change in the inductance of the pressure detection coil 8 corresponds to a change in the permeability of the amorphous magnetic alloy member 7. The detection unit 13 has the same structure as the detection unit 53 in the conventional pressure sensor 55.

A yoke 11 formed of a Ni-Fe alloy including 48% of Ni is welded to the main body 1 at a welding section 14 to cover the pressure detection coil 8 and the dummy coil 9. In this manner, the yoke 11 is substantially completely adhered on the main body 1. As a result, the inside of the yoke 11, is substantially completely sealed from outside the pressure sensor 30. Such a sealed space is filled with dry air 15. Herein, the inside of the yoke 11 includes the space between the main body 1 and the yoke 11, the space between main body 1 and the bobbin 10, the space between the bobbin 10 and the yoke 11, and the hollow section 6.

The pressure sensor 30 having the above-described structure operates in the following manner.

The inner pressure of the container to which the pressure sensor 30 is secured is introduced to the pressure chamber 3 through the pressure inlet 2 to apply a stress to expand the pressure chamber 3. As a result, the deformable section 4 is deformed, and thus a part of the amorphous magnetic alloy member 7 covering the deformable section 4 is also deformed. By such deformation, the permeability of the above-mentioned part of the amorphous magnetic alloy member 7 changes due to a reverse magnetostriction effect of the amorphous magnetic alloy. Such a change in the permeability is detected by the detection unit 13 as a change in the inductance of the pressure detection coil 8. By contrast, the inductance of the dummy coil 9, which is located around the non-deformable section 5, does change. The detection unit 13 obtains the difference between the inductances of the pressure detection coil 8 and the dummy coil 9, thereby obtaining the pressure.

In the case of %he conventional pressure sensor 55, the yoke 51 is attached to the main body 41 by a screw as mentioned above. Humidity or moisture which is generated when the pressure sensor 55 is put in an environment at the dew point or below is put inside the yoke 51 through a gap between the main body 41 and the yoke 51, for example, a gap between the main body 41 and the screw or a gap between the yoke 51 and the screw. The deterioration of the adhesive agent is considered to occur due to such humidity and moisture.

By contrast, in the pressure sensor 30, since the inside of the yoke 11 is substantially completely sealed from outside of the pressure sensor 30, humidity or moisture is prohibited from getting inside the yoke 11. Thus, the deterioration of the adhesive agent including an imide material is prevented. Moreover, since the inside of the yoke 11 is filled with dry air 15 in advance, no moisture exists even when the pressure sensor 30 is put in an environment at the dew point or below. Accordingly, the deterioration of the adhesive agent including an imide material is further prevented.

A thermal shock test and a damp-proof test were performed for both the pressure sensor 30 in the first example and the conventional pressure sensor 55. In the thermal Shock test, both pressure sensors 30 and 55 were subjected to 1,500 cycles of temperature change from −40° C. to 150° C. In the damp-proof test, both of the pressure sensors 30 and 55 were subjected to a humidity of 85% at 85° C. for 3,000 hours. In the case of conventional pressure sensor 55, the adhesive agent including an imide material was deteriorated, and the amorphous magnetic alloy member 47 peeled off after 500 cycles of the thermal shock test and 1,500 hours of the damp-proof test. In the case of the pressure sensor 30 in the first example, the adhesive agent including an imide material was not deteriorated or the amorphous magnetic alloy member 7 did not peel off even after 1,500 cycles of the thermal shock test and the 3,000 hours of the damp-proof test.

In the first example according to the present invention, humidity or moisture is prohibited from getting inside the yoke 11, and no moisture exists inside the yoke 11 even when the pressure sensor 30 is put in an environment at the dew point or below. Thus, the adhesive agent including an imide material is protected against deterioration. Accordingly, the amorphous magnetic alloy member 7 can be prevented from peeling off.

The dry air 15 may be replaced with a gas such as nitrogen or argon gas which contains no moisture and does not corrode the elements of the pressure sensor 30.

EXAMPLE 2

Figure 2:
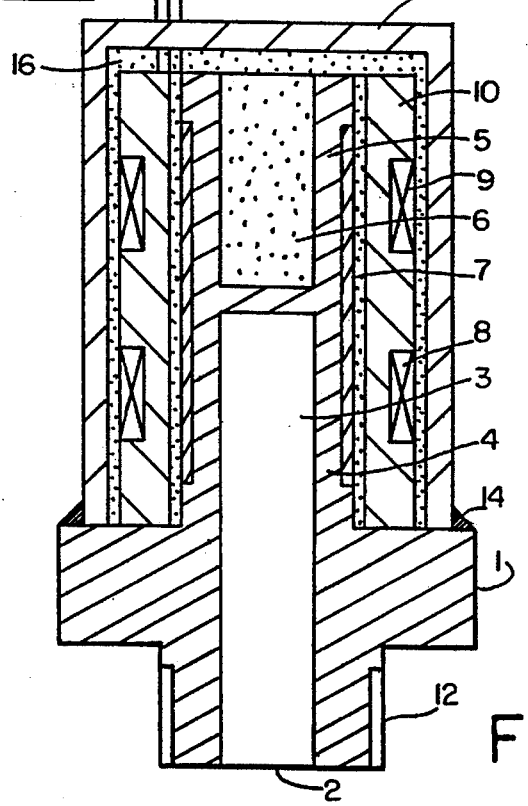
FIG. 2 is a cross sectional view of a pressure sensor in a second example according to the present invention.

With reference to FIG. 2, a second example of a pressure sensor according to the present invention will be described. Elements identical with those in the first example bear identical reference numerals therewith, and explanation thereof will be omitted.

FIG. 2 is a cross sectional view of a pressure sensor 31 in the second example according to the present invention.

In the pressure sensor 31, the main body 1 and the yoke 11 are welded at the welding section 14, and further the inside of the yoke 11 which is sealed from the outside of the pressure sensor 31 is a vacuum area 16. Herein, the word "vacuum" includes a state having a pressure which is negligible with respect to the atmospheric pressure. For example, the vacuum area 16 may have a pressure of 1% or less of the atmospheric pressure, in which case the effect of the present invention can be obtained. In the second example also, the inside of the yoke 11 includes the space between the main body 1 and the yoke 11, the space between the main body 1 and the bobbin 10, the space between the bobbin 10 and the yoke 11, and the hollow section 6.

Due to such a structure, the inside of the yoke 11 is substantially completely sealed from outside the pressure sensor 31, and thus humidity or moisture is prohibited from getting inside the yoke 11. Further, no moisture exists inside the yoke 11 even when the pressure sensor 31 is put in an environment at the dew point or below. Thus, the deterioration of the adhesive agent including an imide material is prevented.

A thermal shock test and a damp-proof test were performed for the pressure sensor 31 under the same conditions as in the first example. The adhesive agent including an imide material did not change in quality, nor did the amorphous magnetic alloy member 7 peel off.

In the second example according to the present invention, the adhesive agent including an imide material is protected against deterioration, and thus the amorphous magnetic alloy member 7 is prevented from peeling off.

In the second example, the pressure applied on the non-deformable section 5, namely, the reference pressure is set to be 0.01 Torr or less. Accordingly, the pressure sensor 31 acts as an absolute pressure sensor.

EXAMPLE 3

With reference to FIG. 3, a third example of a pressure sensor according to the present invention will be described. Elements identical with those in the first example bear identical reference numerals therewith, and explanation thereof will be omitted.

FIG. 3 is a cross sectional view of a pressure sensor 32 in the third example according to the present invention.

In the pressure sensor 32, the inside of the yoke 11 is filled with a resin 17 to substantially completely adhere the yoke 11 on the main body 1. In the third example, a polyurethane resin, which is highly resistant against humidity, is used as the resin 17. Needless to say, in the third example, the inside of the yoke 11 includes the space between the main body 1 and the yoke 11, the space between the main body 1 and the bobbin 10, the space between the bobbin 10 and the yoke 11, and the hollow section 6.

Due to such a structure, the adhesive agent including an imide material is substantially completely covered with the resin 17. Therefore, humidity or moisture is prevented from reaching the adhesive agent. Further, no moisture exists inside the yoke 11 even when the pressure sensor 32 is put in an environment at the dew point or below. Thus, the deterioration of the adhesive agent including an imide material is prevented.

A thermal shock test and a damp-proof test were performed for the pressure sensor 32 under the same conditions as in the first example. The adhesive agent including an imide material did not change in quality, nor did the amorphous magnetic alloy member 7 peel off.

The pressure sensor 32, which does not have the welding section 14 as the pressure sensors 30 and 31 do, can be produced at low cost. Further, the resin 17 has an effect of alleviating heat conduction to the adhesive agent including an imide material during the thermal shock test, which improves the reliability of the pressure sensor 32.

In the third example according to the present invention, the adhesive agent including an imide material is protected against deterioration, and thus the amorphous magnetic alloy member 7 is prevented from peeling off.

The polyurethane resin used for the resin 17 may be replaced with any other epoxy resin having high resistance against humidity as long as the elements of the pressure sensor 32 are not corroded.

EXAMPLE 4

As is described above, in the case of conventional pressure sensors, for example, the pressure sensor 55, uniform output from the pressure detection coil or uniform output from the dummy coil is not obtained for a plurality of the same type of pressure sensors. As for the reasons, the following two are conceivable:

(a) Non-uniformity in coils:

Since there is unavoidable non-uniformity in the manner of winding a wire to form a coil, non-uniformity in the inductance of a plurality of coils cannot be lowered to approximately 1% or less of the value set as a target.

(b) Dispersion in permeability of the yoke:

Generally, when a stress c is applied to a magnetic material, the permeability µ is expressed by equation (1).

$$\mu = A/(B\lambda s\sigma + C) \tag{1}$$

where $\lambda s$ is the magnetostriction constant of the magnetic material, and A, B and C are constants.

Assuming that the stress c is applied to the yoke by attaching the yoke having a magnetostriction constant $\lambda s$ to the main body, the permeability of the yoke is expressed by equation (1). Since the stress with which the yoke is attached to the pressure sensor is different in each pressure sensor, the non-uniformity in the permeability of a plurality of pressure sensors is unavoidable. The yoke is an element of a magnetic circuit as well as the pressure detection coil, the dummy coil, and the amorphous magnetic alloy member. Therefore, non-uniformity in the permeability of the yokes causes non-uniformity in the output characteristics of the pressure sensors.

With reference to FIGS. 4 and 5, a fourth example of a pressure sensor according to the present invention will be described. In the fourth example, non-uniformity in the output characteristics of a plurality of the same type of pressure sensors is reduced. FIG. 4 is a partially cut perspective view of a pressure sensor 33 in the fourth example, and FIG. 5 is a top view of a flat coil 18 used in the pressure sensor 33. Elements identical with those in the first example bear identical reference numerals therewith, and explanation thereof will be omitted.

In the pressure sensor 33, the flat coil 18 including the pressure detection coil 8 and the dummy coil 9 is adhered on the outer peripheral surface of the main body 1 provided with the amorphous magnetic alloy member 7, using an adhesive agent. As is shown in FIG. 5, the flat coil 18 includes a flexible polyimide substrate 19 having a copper foil formed thereon in two identical patterns arranged symmetrically. The two identical patterns act as the pressure detection coil 8 and the dummy coil 9. In the fourth example, the polyimide substrate 19 has an area of 35 mm×30 mm and a thickness of 0.035 mm. The patterns for the pressure detection coil 8 and the dummy coil 9 each have a line width of 0.2 mm, a gap between lines of 2 mm, and a length L of 10 mm. In FIG. 5, the black circles each indicate a terminal of the coil. The terminals are each connected to the detection unit 13 through a lead (not shown) soldered to the terminals. The flat coil 18 is covered with the yoke 11 formed of a Ni-Fe alloy including 48% of Ni.

A plurality of pressure sensors 33 having the above-described structure were produced and evaluated with an excitation frequency of 1 MHz. Non-uniformity in the inductance of both of the coils is reduced, and therefore non-uniformity of the output characteristics of the pressure sensors is approximately halved.

Further, by elimination of the bobbin 10, the diameter of the pressure sensor 33 is approximately 20% smaller than the pressure sensor having the bobbin 10.

In the fourth example according to the present invention, non-uniformity in the output characteristics of a plurality of the same type of pressure sensors is reduced, and the size is also reduced.

EXAMPLE 5

With reference to FIG. 6, a fifth example of a pressure sensor according to the present invention will be described. Elements identical with those in the first example bear identical reference numerals therewith, and explanation thereof will be omitted.

FIG. 6 is a cross sectional view of a pressure sensor 34 in the fifth example according to the present invention.

In the pressure sensor 34, a yoke 21 formed of an amorphous magnetic alloy including Co-Fe-Ni-B-Si having a magnetostriction constant of $1\times10^{-6}$ is used. The yoke 21, which has a thickness of only 0.03 mm, is adhered on the outer periphery surface of the bobbin 10.

The magnetostriction constant of the amorphous magnetic alloy including Co-Fe-Ni-B-Si, namely, $1\times10^{-6}$ is significantly lower than the magnetostriction constant of the Ni-Fe alloy including 48% of Ni, namely, $25\times10^{-6}$. For such a small magnetostriction constant, non-uniformity of the output characteristics of a plurality of the same type of pressure sensors 34 is halved.

In addition, the use of an amorphous magnetic alloy having such a low magnetostriction constant significantly reduces the thickness of the yoke. In the fifth example, the thickness of the yoke 21 is 0.03 mm while the thickness of the yoke 11 in the previous four examples is 1 mm. Accordingly, the size of the pressure sensor is also reduced.

EXAMPLE 6

With reference to FIG. 7, a sixth example according to the present invention will be described. Elements identical with those in the fourth example bear identical reference numerals therewith, and explanation thereof will be omitted.

FIG. 7 is a perspective view of a pressure sensor 35 in the sixth example according to the present invention.

In the pressure sensor 35, the flexible flat coil 18 including the pressure detection coal 8 and the dummy coil 9 is used, and also the yoke 21 formed of an amorphous magnetic alloy including Co-Fe-Ni-B-Si having a low magnetostriction constant is used. As is shown in FIG. 7, the flexible flat coil 18 is adhered to the outer peripheral surface of the amorphous magnetic alloy member 7 with an adhesive agent. The yoke 21 is adhered on the flat coil 18 in the state of being adhered on the outer peripheral surface of the amorphous magnetic alloy member 7. In FIG. 7, the yoke 21 is illustrated in the state of being partially opened for easy understanding.

A plurality of pressure Sensors 35 were produced and evaluated. Non-uniformity in the output characteristics of the pressure sensors 35 was reduced to approximately ¼ of that of the pressure sensors which do not use the flat coil 18 or the yoke 21 formed of an amorphous magnetic alloy including Co-Fe-Ni-B-Si.

Additionally, the bobbin 10 is eliminated and the yoke 21 is thinner than the yoke 11. Therefore, the diameter of the pressure sensor 35 is approximately 40% less than that of the pressure sensors in the first, second and third examples.

Due to the structure of the pressure sensor 35, the magnetic path length of the magnetic circuit including the amorphous magnetic alloy member 7, the flat coil 18, and the yoke 21 is shorter than the pressure sensors in the previous five examples. This enhances the sensitivity of the pressure sensor by three times.

In the sixth example according to the present invention, non-uniformity in the output characteristics of a plurality of the same type of pressure sensors is further reduced, the size of the pressure sensor is reduced, and sensitivity is enhanced.

In this specification, the present invention is applied to pressure sensors as an example. Needless to say, the present invention is also applicable to a dynamic sensor such as a load sensor having a similar basic structure.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A pressure sensor, comprising:
   a main body including a pressure inlet at an end thereof, a deformable section deformed by a pressure introduced through the pressure inlet, and a non-deformable section maintaining a shape thereof even when supplied with a pressure introduced through the pressure inlet;
   an amorphous magnetic alloy member having a magnetostriction constant, the amorphous magnetic alloy member being adhered on the deformable section and the non-deformable section;

a first permeability detection element for detecting the permeability of a part of the amorphous magnetic alloy member corresponding to the deformable section;

a second permeability detection element for detecting the permeability of another part of the amorphous magnetic alloy member corresponding to the non-deformable section; and a yoke for covering the first and the second permeability detection elements, wherein the yoke is adhered on the main body to form a substantially moisture proof seal, wherein the amorphous magnetic alloy member and the first and the second permeability detection elements are included in a magnetic circuit, and pressure detection is performed based on the difference between the permeability detected by the first permeability detection element and the permeability detected by the second permeability detection element, the difference being caused by application of pressure.

2. A pressure sensor according to claim 1, wherein the yoke and the main body are adhered to each other by welding, and a space enclosed by the yoke and the main body and sealed by the welding is filled with a dry gas.

3. A pressure Sensor according to claim 1, wherein the yoke and the main body are adhered to each other by welding, and a space enclosed by the yoke and the main body end enclosed by the welding is a vacuum.

4. A pressure sensor according to claim 1, wherein the amorphous magnetic alloy member is formed of a composition comprising a Fe-Si-B-Cr alloy.

5. A pressure sensor according to claim 1, wherein the first and the second permeability detection elements are each formed by winding a wire.

6. A pressure sensor according to claim 1, wherein the yoke is formed of a magnetic material having a magnetostriction constant, the absolute value of which is $1\times10^{-6}$ at the maximum.

7. A pressure sensor according to claim 6, wherein the yoke is formed of an amorphous magnetic composition comprising a Co-Fe-Ni-B-Si alloy.

8. A pressure sensor, comprising:

a main body including a pressure inlet at an end thereof, a deformable section deformed by a pressure introduced through the pressure inlet, and a non-deformable section maintaining a shape thereof even when supplied with a pressure introduced through the pressure inlet;

an amorphous magnetic alloy member having a magnetostriction constant, the amorphous magnetic alloy member being adhered on the deformable section and the non-deformable section;

a first permeability detection element for detecting the permeability of a part of the amorphous magnetic alloy member corresponding to the deformable section;

a second permeability detection element for detecting the permeability of another part of the amorphous magnetic alloy member corresponding to the non-deformable section; and a yoke for covering the first and the second permeability detection elements, the yoke being adhered on the main body, wherein the amorphous magnetic alloy member and the first and the second permeability detection elements are included in a magnetic circuit, and pressure detection is performed based on the difference between the permeability detected by the first permeability detection element and the permeability detected by the second permeability detection element, the difference being caused by application of pressure, and wherein a space enclosed by the yoke and the main body is filled with a resin.

9. A pressure sensor, comprising:

a main body including a pressure inlet at an end thereof, a deformable section deformed by a pressure introduced through the pressure inlet, and a non-deformable section maintaining a shape thereof even when supplied with a pressure introduced through the pressure inlet;

an amorphous magnetic alloy member having a magnetostriction constant, the amorphous magnetic alloy member being adhered on the deformable section and the non-deformable section;

a first permeability detection element for detecting the permeability of a part of the amorphous magnetic alloy member corresponding to the deformable section;

a second permeability detection element for detecting the permeability of another part of the amorphous magnetic alloy member corresponding to the non-deformable section; and a yoke for covering the first and the second permeability detection elements, the yoke being adhered on the main body, wherein the amorphous magnetic alloy member and the first and the second permeability detection elements are included in a magnetic circuit, and pressure detection is performed based on the difference between the permeability detected by the first permeability detection element and the permeability detected by the second permeability detection element, the difference being caused by application of pressure, and wherein the first and the second permeability detection elements are obtained by forming two identical patterns formed on a flexible substrate and adhering the substrate on an outer peripheral surface of the amorphous magnetic alloy member.

10. A pressure sensor according to claim 9, wherein the flexible substrate is formed of polyimide.

11. A pressure sensor according to claim 9, wherein the yoke is formed of a magnetic material having a magnetostriction constant, the absolute value of which is $1\times10^{-6}$ at the maximum.

12. A pressure sensor, comprising:

a main body including a pressure inlet at an end thereof, a deformable section deformed by a pressure introduced through the pressure inlet, and a non-deformable section maintaining a shape thereof even when supplied with a pressure introduced through the pressure inlet;

an amorphous magnetic alloy member having a magnetostriction constant, the amorphous magnetic alloy member being adhered on the deformable section and the non-deformable section;

a first permeability detection element for detecting the permeability of a part of the amorphous magnetic alloy member corresponding to the deformable section;

a second permeability detection element for detecting the permeability of another part of the amorphous magnetic alloy member corresponding to the non-deformable section; and a yoke for covering the first and the second permeability detection elements, wherein the amorphous magnetic alloy member and the first and the second permeability detection elements are included in a magnetic circuit, and pressure detection is performed based on the difference between the permeability detected by the first permeability detection element and the permeability detected by the second permeability detection element, the difference being caused by application of pressure, and wherein the first and the second permeability detection elements are obtained by forming two identical patterns formed on a flexible substrate and adhering the substrate on an outer peripheral surface of the amorphous magnetic alloy member.

13. A pressure sensor according to claim 12, wherein the flexible substrate is formed of polyimide.

14. A pressure sensor, comprising:

a main body including a pressure inlet at an end thereof, a deformable section deformed by a pressure introduced through the pressure inlet, and a non-deformable section maintaining a shape thereof even when supplied with a pressure introduced through the pressure inlet;

an amorphous magnetic alloy member having a magnetostriction constant, the amorphous magnetic alloy member being adhered on the deformable section and the non-deformable section;

a first permeability detection element for detecting the permeability of a part of the amorphous magnetic alloy member corresponding to the deformable section;

a second permeability detection element for detecting the permeability of another part of the amorphous magnetic alloy member corresponding to the non-deformable section; and a yoke for covering the first and the second permeability detection elements, wherein the amorphous magnetic alloy member and the first and the second permeability detection elements are included in a magnetic circuit, and pressure detection is performed based on the difference between the permeability detected by the first permeability detection element and the permeability detected by the second permeability detection element, the difference being caused by application of pressure, and wherein the yoke is formed of a magnetic material having a magnetostriction constant, the absolute value of which is $1 \times 10^{-6}$ at the maximum.

15. A pressure sensor according to claim 14, wherein the yoke is formed of an amorphous magnetic composition comprising a Co-Fe-Ni-B-Si alloy.

16. A pressure sensor, comprising:

a main body including a pressure inlet at an end thereof, a deformable section deformed by a pressure introduced through the pressure inlet, and a non-deformable section maintaining a shape thereof even when supplied with a pressure introduced through the pressure inlet;

an amorphous magnetic alloy member having a magnetostriction constant, the amorphous magnetic alloy member being adhered on the deformable section and the non-deformable section;

a first permeability detection element for detecting the permeability of a part of the amorphous magnetic alloy member corresponding to the deformable section;

a second permeability detection element for detecting the permeability of another part of the amorphous magnetic alloy member corresponding to the non-deformable section; and a yoke for covering the first and the second permeability detection elements, wherein the amorphous magnetic alloy member and the first and the second permeability detection elements are included in a magnetic circuit, and pressure detection is performed based on the difference between the permeability detected by the first permeability detection element and the permeability detected by the second permeability detection element, the difference being caused by application of pressure, wherein the first and the second permeability detection elements are obtained by forming two identical patterns formed on a flexible subs%rate and adhering the substrate on an outer peripheral surface of the amorphous magnetic alloy member, and wherein the yoke is formed of a magnetic material having a magnetostriction constant, the absolute value of which is $1 \times 10^{-6}$ at the maximum.

17. A pressure sensor according to claim 16, wherein the flexible substrate is formed of polyimide.

18. A pressure sensor according to claim 16, wherein the yoke is formed of an amorphous magnetic composition comprising a Co-Fe-Ni-B-Si alloy.

* * * * *

UNITED STATES PATENT AND TRADEMARK OFFICE
CERTIFICATE OF CORRECTION

PATENT NO. : 5,490,424
DATED : February 13, 1996
INVENTOR(S) : Rihito Shoji and Shinji Saitou It is certified that error appears in the above-indentified patent and that said Letters Patent is hereby corrected as shown below:

```
Column 6, line 29, delete "%he" and substitute --the--.
Column 11,
In Claim 3, line 1, delete "Sensor" and substitute --sensor--.
Column 14,
In Claim 16, line 30, delete "subs%rate" and substitute
```
--substrate--.

Signed and Sealed this

Twenty-second Day of October, 1996

Attest:

BRUCE LEHMAN

*Attesting Officer*　　　*Commissioner of Patents and Trademarks*